United States Patent [19]

Matsuoka et al.

[11] Patent Number: 5,034,884
[45] Date of Patent: Jul. 23, 1991

[54] SYSTEM PROVIDING KEY SCAN KEY ADDRESS EXTRACTION AND BITWISE SIGNAL TRANSMISSION BETWEEN INPUT UNIT AND SIGNAL PROCESSING UNIT IN PARALLEL

[75] Inventors: Shigeru Matsuoka; Masanobu Nagaoka, both of Hitachi, Japan

[73] Assignee: Hitachi, Ltd., Tokyo, Japan

[21] Appl. No.: 844,122

[22] Filed: Mar. 26, 1986

[30] Foreign Application Priority Data

Mar. 29, 1985 [JP] Japan .................................. 60-63901

[51] Int. Cl.⁵ .......................... G06F 13/22; G06F 3/02
[52] U.S. Cl. ..................................... 364/200; 364/260;
364/271; 364/234; 364/237.82; 364/234.1;
364/259; 364/259.3; 364/259.9; 364/259.4;
364/242; 364/239.51; 364/244.5; 364/271.4;
364/928; 364/928.1; 364/929.1; 364/934;
364/934.1; 364/939.81; 364/942.8; 364/949.3;
364/949.5; 364/950; 364/950.3
[58] Field of Search ..................................... 340/365 R;
364/200 MS File, 900 MS File; 341/22, 26, 27

[56]  References Cited

U.S. PATENT DOCUMENTS

| 3,882,461 | 5/1975 | Vinneman | 371/71 |
| 3,973,244 | 8/1976 | Lovercheck et al. | 364/200 |
| 4,193,113 | 3/1980 | Cykowski | 364/200 |
| 4,222,038 | 9/1980 | Magerl | 364/200 |
| 4,264,954 | 4/1981 | Briggs et al. | 364/200 |
| 4,307,446 | 12/1981 | Barton et al. | 364/200 |
| 4,335,374 | 6/1982 | Nyuji | 341/26 |
| 4,396,915 | 8/1983 | Farnsworth et al. | 364/200 |
| 4,398,181 | 8/1983 | Yamamoto | 340/365 S |
| 4,408,184 | 10/1983 | Ishii | 341/26 |
| 4,408,191 | 10/1983 | Fowler | 341/26 |
| 4,434,472 | 2/1984 | Kachun | 364/900 |
| 4,482,955 | 11/1984 | Amano et al. | 364/200 |
| 4,502,038 | 2/1985 | Lowenthal et al. | 341/26 |
| 4,554,530 | 11/1985 | Mussmann | 341/26 |
| 4,591,833 | 5/1986 | Ishii | 341/26 |
| 4,599,608 | 7/1986 | Matsuoka | 341/26 |
| 4,609,908 | 9/1986 | Amano | 340/365 R |
| 4,617,554 | 10/1986 | Krause | 340/365 R |
| 4,644,497 | 2/1987 | Tajima | 341/26 |
| 4,706,068 | 11/1987 | Eberhard | 340/365 S |
| 4,712,092 | 12/1987 | Boldridge | 340/365 S |
| 4,739,310 | 4/1988 | Yamamoto | 341/26 |
| 4,853,888 | 8/1989 | Lata | 364/900 |
| 4,878,056 | 10/1989 | Isoda | 341/26 |
| 4,918,445 | 4/1990 | Bower | 341/26 |

FOREIGN PATENT DOCUMENTS 59-65349  2/1984  Japan .

Primary Examiner—Archie E. Williams, Jr.
Assistant Examiner—Eric Coleman
Attorney, Agent, or Firm—Antonelli, Terry, Stout & Kraus

[57]  ABSTRACT

Signal transmission method and apparatus is an input unit for inputting signals through operation of keys. Addresses of the operated keys are extracted through scanning and sent to a signal processing unit, while signals from the signal processing unit are subsequently received. For allowing the scanning to be performed even at the times of signal sending and reception, the scanning period is divided into a number of intervals equal to the numbers of bits which constitute the signal to be transmitted, wherein the sending and reception of the signal to be transmitted are performed in synchronism with the scanning intervals.

13 Claims, 11 Drawing Sheets

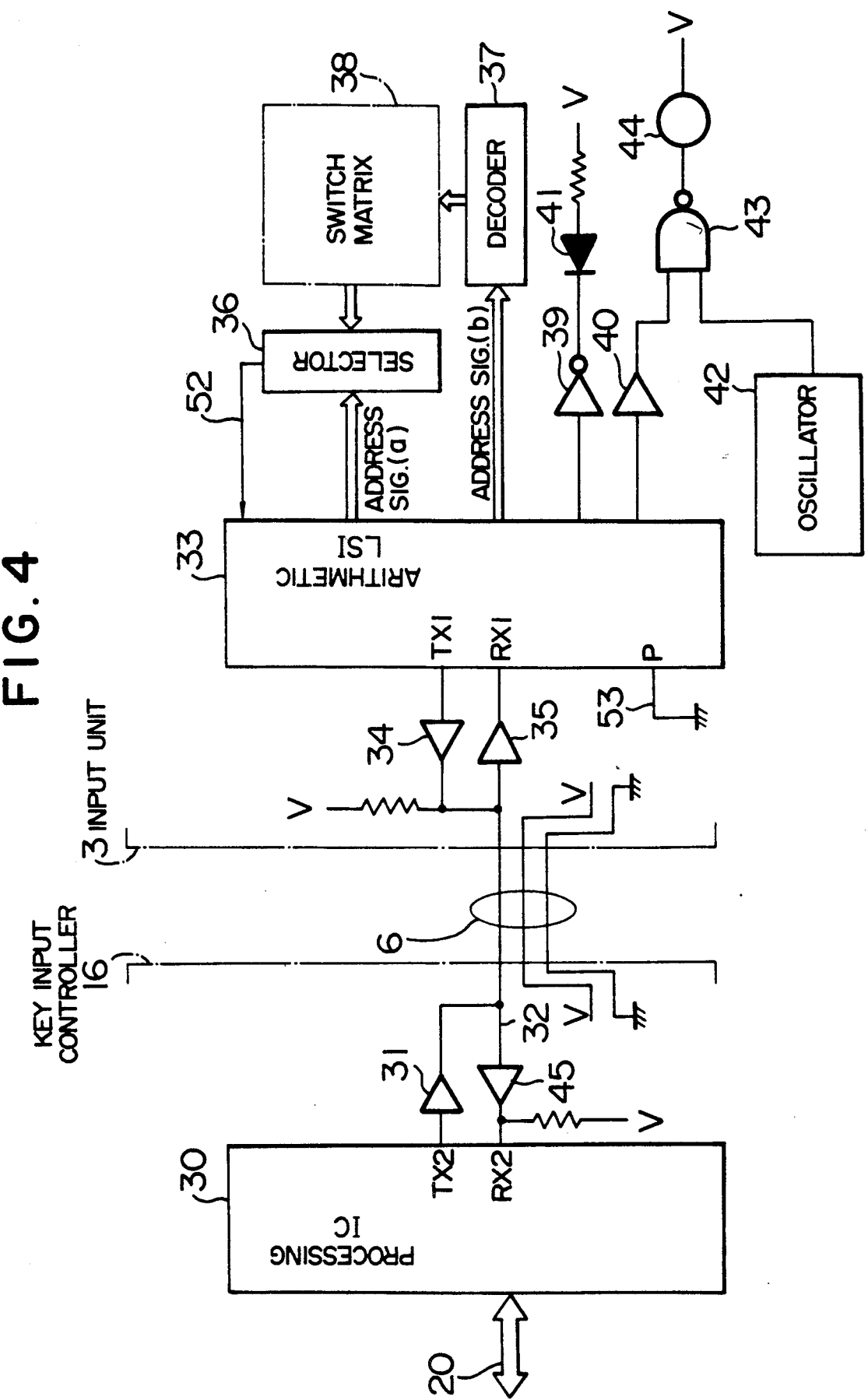

DATA FORMAT

RECEIVING FORMAT

SENDING FORMAT

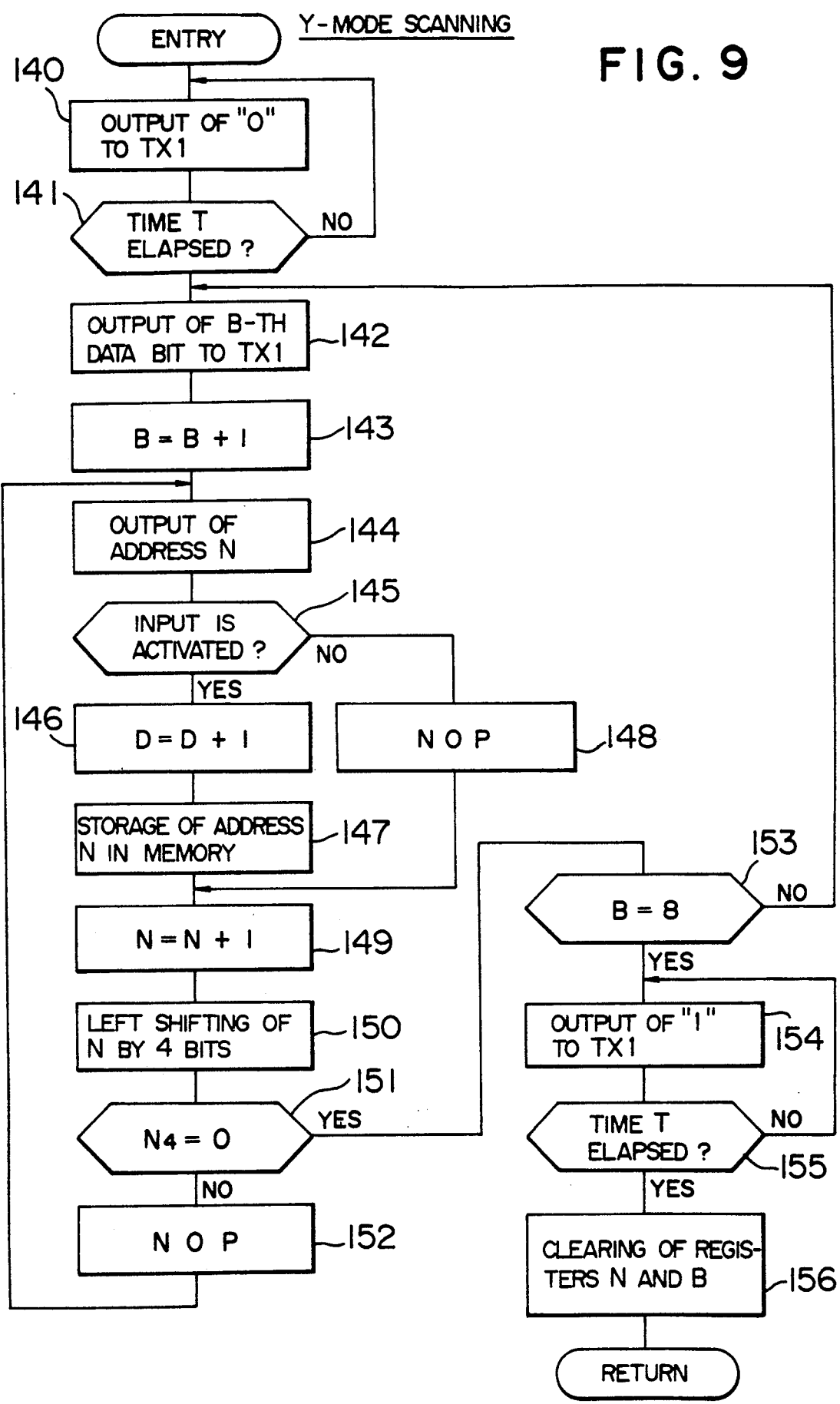

5,034,884

SYSTEM PROVIDING KEY SCAN KEY ADDRESS EXTRACTION AND BITWISE SIGNAL TRANSMISSION BETWEEN INPUT UNIT AND SIGNAL PROCESSING UNIT IN PARALLEL

BACKGROUND OF THE INVENTION

The present invention generally relates to signal transmission method and apparatus, and more particularly to a signal transmission method and apparatus for an input unit of an information or data processing system in which the input unit having a number of contacts and a CPU is coupled to a main control circuit of the system through a serial transmission path.

The signal transmission system of the type mentioned above is disclosed in Japanese Unexamined Patent Application Publication No. 65349/1984. According to this hitherto known technique, the input unit includes a number of contacts switched (turned on or off) by selectively actuating a number of keys arrayed on a keyboard and a CPU for controlling data transmission and reception. The input unit repeatedly executes sequentially a key switch status extracting process for extracting the switched key, a data sending processing for sending the address of the extracted key to a main control circuit and a data reception processor for receiving signals from the main control circuit.

With a view to reducing the number of conductors for interconnecting the main control circuit incorporated in the system main body and the input unit, a half duplex serial transmission system is adopted in which the data sending and reception are carried out through a single signal line. In other words, a series of processes are cyclically and repetitionally executed over an actuated switch extracting period $T_1$, a data sending process period $T_2$ and a data reception process period $T_3$. According to the teachings disclosed in the literature cited above, the system can operate without involving collision among data with the single signal line. However, since the aforementioned process modes $T_1$, $T_2$ and $T_3$ are repeated, the actual operated key switch extracting time is reduced to a value determined by $$\frac{T}{T_1 + T_2 + T_3}$$

In other words, when the key switch is operated in the time interval of $(T_2+T_3)$, the response is delayed until the time $(T_2+T_3)$ has elapsed. This means that when a given key switch is turned on and off within the period mentioned above, the turn-on operation of the key switch can not be extracted or detected, giving rise to a problem.

SUMMARY OF THE INVENTION

An object of the present invention is to provide a signal transmission method and apparatus in which the key switch status extracting process in an input unit can be executed not only during the key switch status extracting period ($T_1$), but also during the data sending process period ($T_2$) and the data reception processing period ($T_3$)

Another object of the present invention is to provide a signal transmission method and apparatus in which signal transfer between the input unit and the main control circuit can be accomplished with high efficiency through a minimum number of signal lines.

In view of the above objects, there is proposed according to a general aspect of the present invention a signal transmission system in which an input unit having a plurality of contacts is connected to a signal processing unit for processing signals supplied from the input unit through at least three lines, wherein at least one of these lines is used a the signal line for sending or receiving signals. It is taught according to the invention that the timing for extracting the contact closing operation in the input unit is synchronized with the data sending or receiving timing.

More specifically, in conjunction with the data transfer between the main control circuit and the input unit, the timing at which the data is transmitted to or received from the main control circuit is generated with reference to the timing at which the operation for extracting the switched key or contact (hereinafter referred to as the scanning) is performed. In other words, when data is to be sent out, the data sending or transmitting timing is determined with reference to the scanning timing and the data receiving timing is also determined with reference to the scanning timing. As a consequence, synchronism is established between the scanning timing and the data receiving or sending timing.

BRIEF DESCRIPTION OF THE DRAWINGS

FIG. 4 is a block diagram showing a circuit configuration of a signal transmission system according to an embodiment of the present invention interposed between a key input control device of the main control circuit and the input unit;

FIGS. 6 to 11 are flow charts for illustrating operations of the signal transmission system according to an embodiment of the present invention.

DESCRIPTION OF THE PREFERRED EMBODIMENTS

Figure 1:
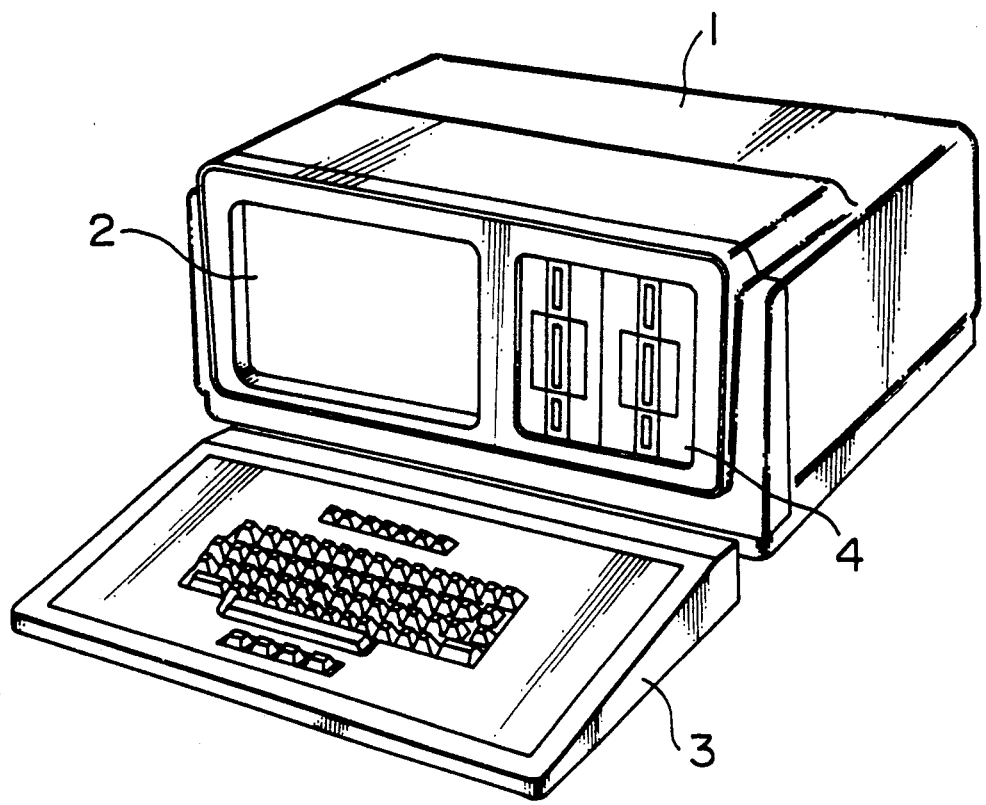
FIG. 1 is a perspective view showing an outer appearance of a data processing apparatus to which the present invention can be applied.

Referring to FIG. 1, there is shown in a perspective view an outer appearance of a conventional information or data processing apparatus incorporating a floppy disc unit.

A reference numeral 1 denotes a main body which houses therein a cathode ray tube or CRT 2 for presenting status displays, a floppy disc drive 4 for driving floppy disc memory media (hereinafter referred to as floppy disc) and a main control circuit 5 shown in FIG. 2 which will be described in detail below.

Disposed in front of the main body 1 is an input unit 3 which includes a number of contacts corresponding to a number of keys arrayed in the form of a keyboard for allowing an operator to input characters and other data.

Figure 2:
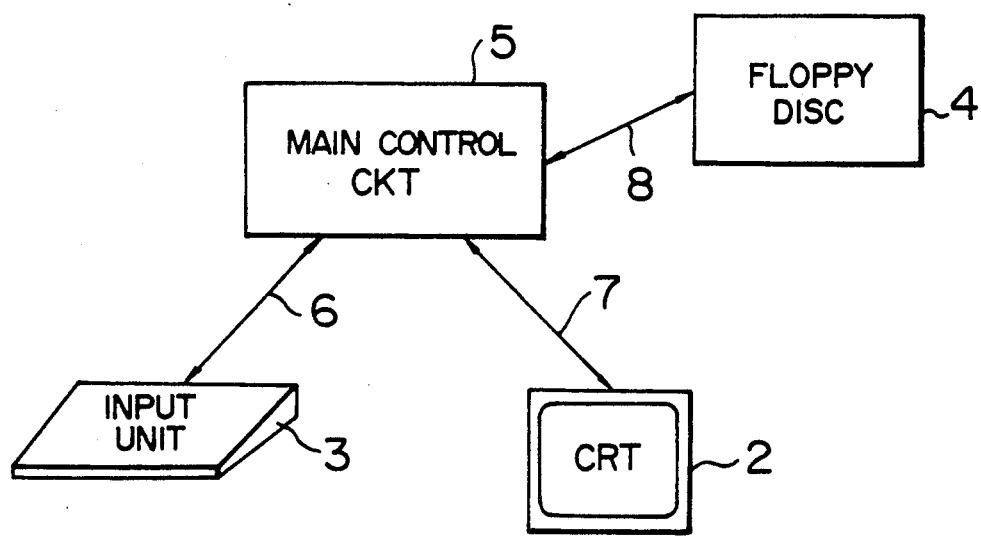
FIG. 2 is a block diagram showing interconnection among various elements constituting the data processing apparatus shown in FIG. 1.

FIG. 2 is a schematic view showing in general a wiring arrangement of the information or data processing unit shown in FIG. 1. Referring to FIG. 2, the main control circuit 5 associated with a data processing unit for processing signals supplied from the input unit or keyboard 3, the CRT display 2, the floppy disc drive 4 and the input unit 3 are mutually interconnected through cables 6, 7 and 8. The cable 6 includes at least one signal line, a grounded (earth potential) line and a power supply line. When the input unit and the main control circuit incorporate respective power supply sources, the cable 6 may be composed of at least two lines. The signal line serves for receiving and sending signals.

Figure 3:
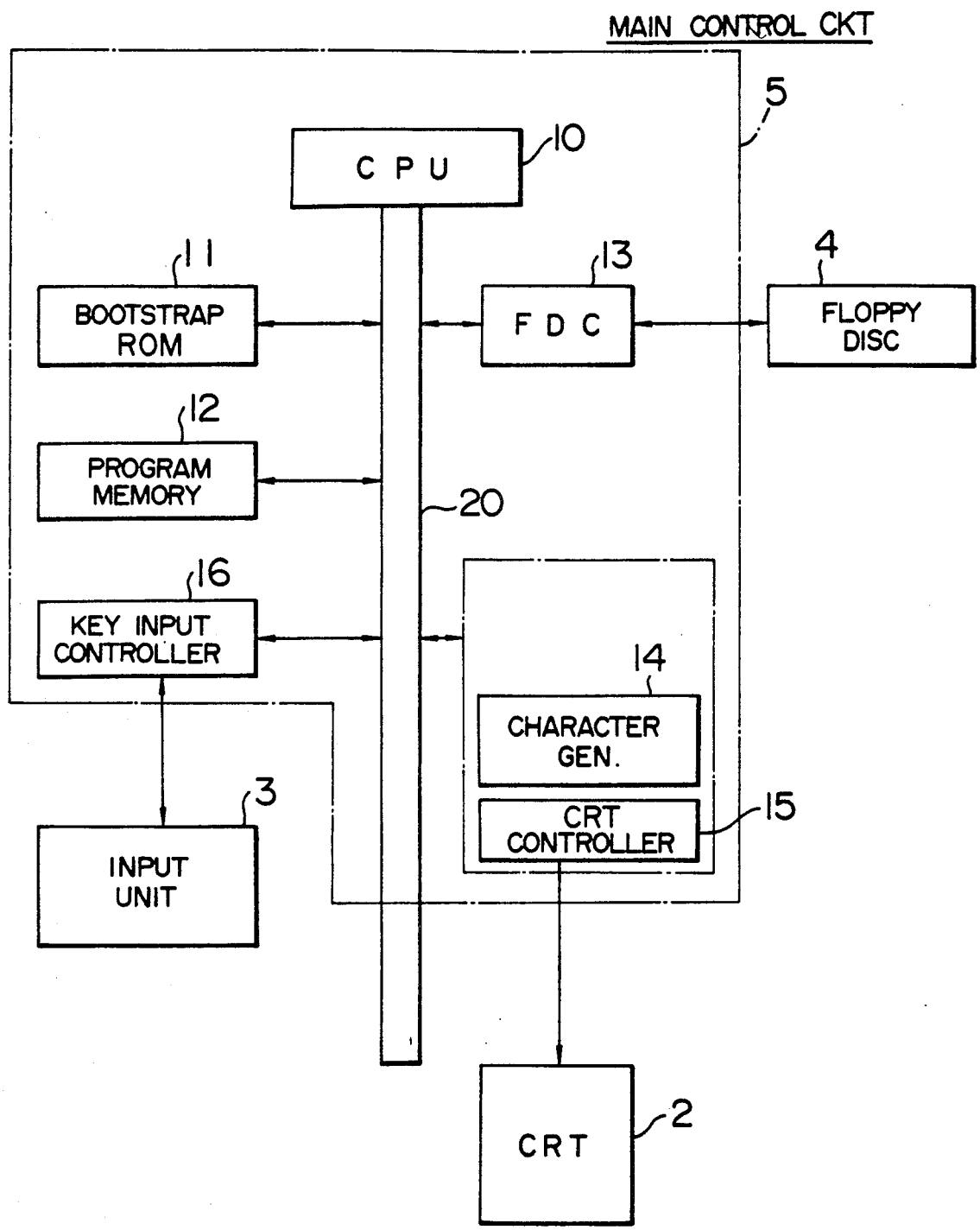
FIG. 3 is a block diagram showing an arrangement of a main control circuit shown in FIG. 2.

Now, description will be made of the main control circuit 5 by referring to FIG. 3 which shows the same in a block diagram.

A reference numeral 10 denotes a program storage type computer unit (hereinafter referred to as CPU in abbreviation) which includes a nonvolatile memory 11 which serves as a bootstrap ROM (read-only memory) for storing a program to be executed at the time of power-on. A numeral 12 denotes a RAM (random access memory) which serves as a program memory for storing a program for executing documentation processes, a numeral 14 denotes a character generator which stores therein dot data representing Chinese characters in dot matrix as indexes for the Chinese characters, and a numeral 15 denotes a CRT controller serving for reading out the dot data from the character generator 14 and generating a signal for actuating the CRT 2. A reference numeral 13 denotes a floppy disc control circuit (also referred to as FDC in abbreviation) for controlling the floppy disc unit serving as a temporary memory. This circuit may be constituted by a commercially available device such as "MB 8877A" manufactured by Fuji Communication Company of Japan. A reference numeral 16 denotes a key input control circuit for controlling key input information issued by the input unit 3. All the circuits mentioned above are interconnected by a bus line 20.

With the arrangement described above, upon power-on, the CPU 10 executes a program stored in the bootstrap ROM 11 which functions as an initial program loader. In general, the function of the initial program is to transfer a system program stored in the floppy disc placed in the disc drive 4 to the program memory 12. Upon completion of this transfer, the CPU 10 changes the control thereof to the leading address of the system program now stored in the program memory 12. As a consequence, the processes such as display of characters on the CRT 2, documentation and the like can be performed through the key input controller 16 and the CPU 10 in accordance with the key inputs through the input unit 3.

FIG. 4 is a block diagram showing in detail an interface circuit arrangement between the key input controller 16 of the main control circuit 5 and the input unit 3 to which the signal transmission system according to an embodiment of the present invention can find a practical application.

Referring to FIG. 4, the key input controller 16 includes a processing integrated circuit (hereinafter referred to as processing IC) 30, buffer elements 31 and 45 of open-collector type for data sending and receiving which each have one terminal connected, respectively, to the terminals TX2 and RX2 of the processing IC 30, and a signal line 32 connected to the other terminals of the buffer elements 31 and 45.

The numeral 20 denotes the bus line mentioned above.

On the other hand, the input unit 3 includes an arithmetic large scale integrated circuit (hereinafter referred to as the arithmetic LSI) 33 capable of performing the functions similar to those of a CPU, buffer elements 34 and 35 of open-collector type for data sending and receiving which each have a terminal connected, respectively, to terminals TX1 and RX1 of the arithmetic LSI 33. A signal line 32 is connected to the other terminals of the buffer element 34 and 35 for superposition of data, a power supply source V is connected to the signal line 32 through a resistor, a selector circuit 36 is connected to another terminal of the arithmetic LSI 33, a decoder circuit 37 is connected to another terminal of the arithmetic LSI 33, a switch matrix 38 is interposed between the selector circuit 36 and the decoder circuit 37, a NOT element 39 is connected to another terminal of the arithmetic LSI 33 for activating a light emission diode (LED) 41 serving for displaying erroneous key manipulations or the like, a power supply source V is connected through a resistor to the remaining terminal of the LED 41, a buffer element 40 is connected to a further terminal of the arithmetic LSI 33 for activating a buzzer 44 serving for alarming erroneous key manipulations or the like, a two-input NAND element 43 having one input connected to the output terminal of the buffer element 40, and an oscillation circuit 42 is connected to the other input of the NAND element 43 whose output terminal is connected to the buzzer 44, a power supply source V is connected to the remaining terminal of the buzzer 44, and a P-port input 53 is connected to the other terminal of the arithmetic LSI 33.

In operation, when data is supplied to the processing IC 30 from the CPU 10 by way of the bus line 20, control data is outputted from the terminal TX2 of the processing IC 30 to be sent onto the signal line 32 and supplied to the input RX1 of the arithmetic LSI 33 by way of the buffer element 35 incorporated in the input unit 3. The control data consists of eight bits, wherein the first bit $D_0$ is utilized for identification of the type of the input unit, the second bit $D_1$ is used as a dummy data request signal, the third bit $D_2$ is utilized as the buzzer on/off signal, the fourth bit $D_3$ is utilized as the LED on/off signal, the fifth bit $D_4$ is utilized as a scanning start signal, the sixth bit $D_5$ is utilized as a scanning stop signal, the seventh bit $D_6$ is utilized as a signal for executing initialization of flags and others, and finally the eighth bit $D_7$ is utilized as a re-send request signal. The arithmetic LSI 33 determines the type of control on the basis of the bit states of the control data. In accordance with the result of determination, the LED 41 is activated through the NOT element 39 or a high level signal is applied through the buffer element 40 to one input of the two-input NAND element 43 whose other input terminal is connected to the output of the oscillation circuit 42 to thereby activate the buzzer 44 in synchronism with the output of the oscillation circuit 42. For more details, reference may be made to the aforementioned Japanese Unexamined Patent Application Publication No. 65349/1984.

Next, description will be made on the scanning operation for extracting information about locations of the keys of the input unit 3 which are actuated or switched on (referred to as the switch-on key).

The arithmetic LSI 33 includes an address counter consisting of eight bits. An address signal (a) including four less significant bits (LSB) is supplied to the selector circuit 36, while an address signal (b) of four more significant bits (MSB) is supplied to the decoder circuit 37. The latter designates sequentially the columns of the switch matrix 38 to be scanned in accordance with the address signal (b). On the other hand, the selector circuit 36 scans to read out the status of the individual keys in accordance with the address signal (a) for the purpose of detecting the presence of a switched-on key in the column designated by the decoder circuit 37. In this manner, all the keys are scanned. Upon detection of the switched-on key in the course of the scanning operation, the selector circuit 36 produces a high level output signal on the line 52 at the timing determined by the address signals (a) and (b) associated with the switched-on key, to inform the arithmetic LSI 33 of the switched-on key. The arithmetic LSI 33 in turn stores the corresponding address (a) and (b) in an incorporated memory upon reception of the switched-on information.

By executing repetitionally the process described above, the addresses of the switch matrix 38 corresponding to the switched-on keys are extracted to be subsequently outputted as data from the terminal TX1 of the arithmetic LSI 33, and the data is sent onto the signal line 32 through the buffer element 34. The data is then inputted to the processing IC 30 through the cable 6 and the buffer element 45 of the key input controller 16 to be subsequently supplied through the bus line 20 to the CPU 10 where the switched-on keys are discriminatively identified, resulting ultimately in that the corresponding data are displayed on the CRT 2 through cooperation of the character generator 14 and the CRT controller 15.

Next, in conjunction with the circuit arrangement described above, the signal transmission process according to the preferred embodiment of the invention will be elucidated.

Figure 5A:
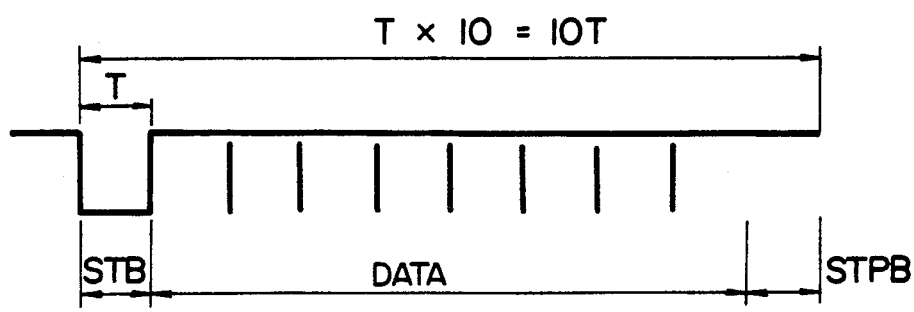
FIGS. 5A to 5C are views for illustrating data formats for data sending and reception.
Figure 5B:
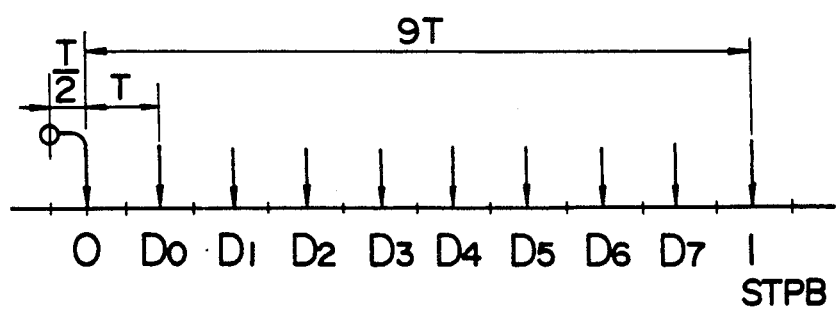
Figure 5C:
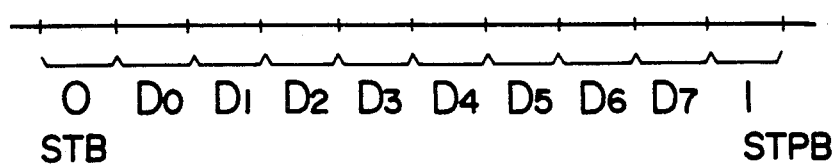

FIG. 5A to 5C are views illustrating the data to be sent or received through the buffer element 34 or 35 and the signal line 32.

More specifically, FIG. 5A shows a format of data to be sent or received. The format including the data of eight bits interposed between a start bit STB and a stop bit STPB is known as the nonreturn-to-zero (hereinafter referred to as NRZ in abbreviation) code type.

FIG. 5B illustrates a data receiving format. Upon lapse of time T/2 from the time point at which the falling of the start bit STB is detected, the level of zero is confirmed. Subsequently, data sampling is effected at every time interval of T at the time point corresponding to the center of each bit duration, to read the data bits $D_0$ to $D_7$. Upon detecting the stop bit STPB of level "1", the reading of one set of data is completed.

FIG. 5C is a view illustrating a data sending format. Data bits $D_0$ to $D_7$ are interposed between the start bit STB of level "0" and the stop bit STPB of level "1", constituting one set of data.

Referring to FIGS. 6 to 11, the processing will be described in more detail.

Figure 6:
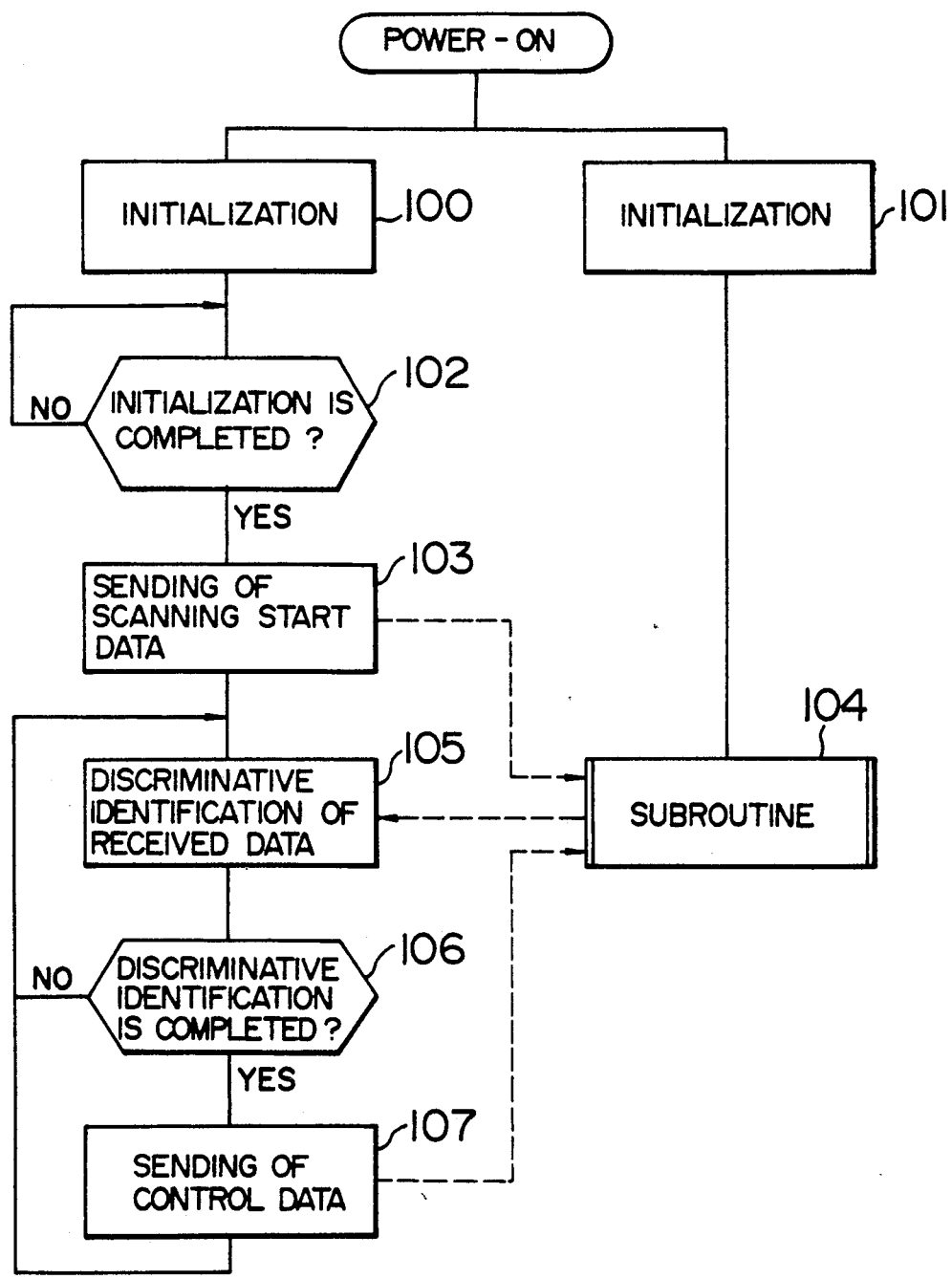

Referring first to FIG. 6, initialization processing for initializing the counter and registers incorporated in the key input controller 16 and the input unit 3 are executed at steps 100 and 101 in succession to the power-on. Subsequently, the key input controller 16 shown in FIG. 4 is activated while the input unit 3 is placed in the stand-by state. At a step 102, it is determined whether the initialization process has been completed. If so, the scanning start data (i.e. the data in which only the data bit $D_5$ is "1" in the data format illustrated in FIG. 5B) is sent out.

In response to the scanning start data, a subroutine corresponding to a step 104 (details of which will be described later with reference to FIG. 7) is set to the state ready for performing the scanning process, and the data composed of the addresses (a) and (b) of the switched-on key is sent to a step 105 where the data received from the input unit 3 is discriminatively identified, being followed by a decision step 106 for deciding whether the identification step has been completed. Subsequently, control data is sent out at a step 107.

The control data undergoes an analyzing process through the subroutine at the step 104. The steps 105, 106, 107 and 104 are then repeatedly executed under predetermined conditions.

Next referring to FIG. 7, those portions of the aforementioned subroutine 104 which are related to the invention will be described.

At a step 108, it is checked whether the potential at the terminal RX1 of the arithmetic LSI 33 is inverted from "1" to "0". If so, it is then determined whether the inversion corresponds to the start bit of the scanning start data issued at the step 103 shown in FIG. 6 or the start bit of the control data issued at the step 107. Subsequently, a register A the purpose of which will be described below is checked at a step 109.

When it is found that the content A of the register A is equal to "0", this means the reception processing mode. Accordingly, the scanning of Z-mode is executed at a step 110. In this mode, the reception processing and the scanning are performed concurrently, as will be described later on by referring to FIG. 10. More specifically, the reception of data is effected simultaneously with the scanning processing in synchronism with each other.

At a step 111, the content of a register D indicating the number of the switched-on keys found through the scanning in the course of execution of the above processing is checked. When D=0, this means that no switched-on keys are present. Accordingly, at a step 113, the register A is set to "2". On the other hand, when D≧1, the register A is set to "1" at a step 112. As will now be understood, the content of the register A equal to "2" means that the scanning should again be performed because of absence of data to be sent out. On the other hand, the content of the register A equal to "1" indicates that the sending processing and the scanning should be executed concurrently.

At a step 114, the data as received is processed to activate the LED 41 or the buzzer 44. Subsequently, jump is made to the step 109 to further procede with the processing in accordance with the content of the register A.

The content of the register A equal to "1" indicates that the data to be sent out exists. Accordingly, at a step 119, the data sending process and the scanning are performed concurrently. This operation is referred to as the scanning of Y-mode which will be hereinafter described in detail by referring to FIG. 9. In this Y-mode, the sending of data and the scanning are conducted simultaneously in synchronism with each other. Thereafter, at a step 120, the register A is set to "0", which means that a signal to be received from the main control circuit 5 should be awaited in succession to the sending of data.

When it is found at the step 109 that the content of the register A is equal to "2", scanning of X-mode is executed at a step 115. In this mode, only the scanning is effected without being accompanied with the sending or reception processing. Subsequently, it is checked at a step 116 whether D≧1. If so (i.e. the result of the step 116 is affirmative), the register A is set to "1" at a step 117, which means that the Y-mode scanning be executed with the data sending processing being effected concurrently with the scanning.

When D=0, the register A is set to "2" at a step 118, which means that the X-mode scanning be executed. Accordingly, this mode is executed consecutively until key manipulation takes place.

Next, the scannings of modes X, Y and Z mentioned above will be elucidated in more detail.

Figure 8:
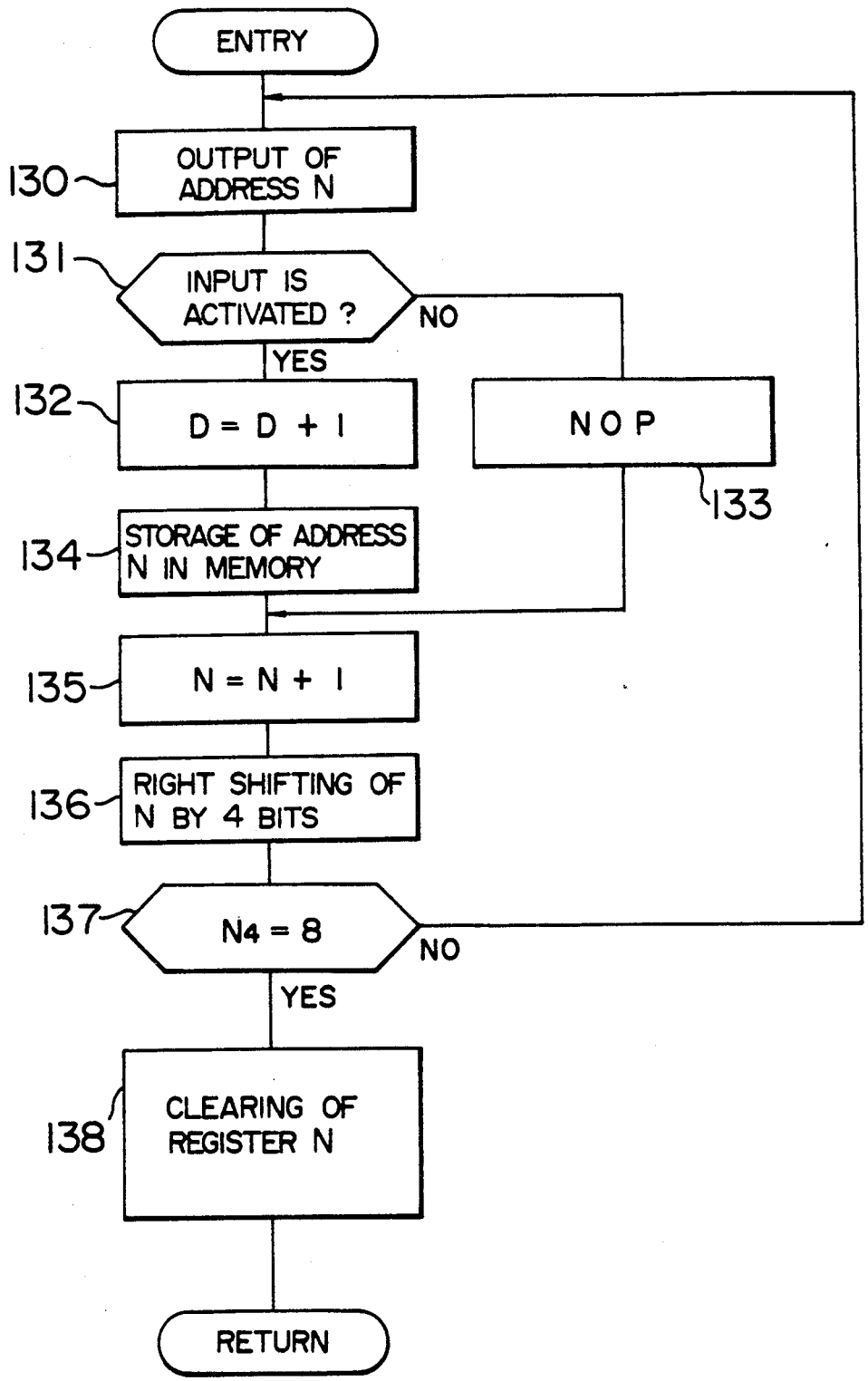

FIG. 8 is a view for illustrating the X-mode scanning.

At a step 130, an address N is outputted. The register for storing the address N is initially cleared to "0" at the step 101 shown in FIG. 6. Thereafter, this register is cleared only at a step 138 mentioned below. It should be noted that the address N corresponds to the address signals (a) and (b) to be supplied to the selector circuit 36 and the decoder circuit 37 shown in FIG. 4.

Next, at a step 131, it is checked whether there is input signal or not. This correspond to the check as to whether the output signal 52 of the selector circuit 36 shown in FIG. 4 is at high level or not. When the input signal is found to be present, the register D is incremented at a step 132, while the address N at that time point is stored in a memory.

On the other hand, when no input signal is present, a no operation processing (NOP) corresponding to the steps 132 and 134 is inserted. More specifically, time matching is performed so that the processes executed through any routes result in the same time interval.

At a step 135, the address N is incremented, being followed by a step 136 where the address N is shifted to the right by four bits. At a step 137, it is checked whether the data N4 resulting from the step 136 is equal to "8" for the purpose of determining whether the scanning of the address 0 to 127 has been completed. More specifically, "10000000" is shifted to the right by four bits to check whether "00001000" resulting from the shift is equal to "8". If not (i.e. N4≠8), this means that the scanning of the addresses 0 to 127 has not been completed yet. Accordingly, jump is made to the step 130 and the similar processes are repeatedly performed. When N4=8 at the step 137, the register for the address N is cleared at the step 138.

FIG. 9 is a view for illustrating the Y-mode scanning. In this mode, the processing for sending data to the main control circuit 5 is performed concurrently with the scanning, wherein synchronism is established by matching the updating of the address to be scanned with the bit length of data to be sent.

At a step 140, the signal "0" is applied to the terminal TX1. This process is repeatedly executed until the time set at a time T has elapsed (step 141) to thereby produce the start bit length. The matching between the updating of the scanning address and the bit length of data to be sent out, i.e. synchronism therebetween will be described. As is the case with the sending format illustrated in FIG. 5C, it is assumed that the start bit STB is "0" and that the stop bit STPB is "1" with the data consisting of eight bits $D_0$ to $D_7$.

Further, it is assumed that correlation between the scanning addresses 0 to 127 and the data bits are as follows.

| Scanning Address | | Data Bit |
|---|---|---|
| 00000000 | | |
| 00000001 | } = | $D_0$ |
| 00010000 | | |

-continued

| Scanning Address | | Data Bit |
|---|---|---|
| 00011111 | } = | $D_1$ |
| 01100000 | | |
| 01101111 | } = | $D_6$ |
| 01110000 | | |
| 01111111 | } = | $D_7$ |

As will be seen, 16 scanning addresses constitute one data bit length.

At a step 142, the B-th bit of the address data stored in the memory at the step 134 shown in FIG. 8 is outputted to the terminal TX1.

At a step 143, the register B is stepped to store the data bit to be next sent.

At a step 144, the address N is outputted. This corresponds to the address signals (a) and (b) supplied to the selector circuit 36 and the decoder circuit 37 shown in FIG. 4. Next, at a step 145, it is checked whether an input signal is present or not. This corresponds to the check as to whether the output line 52 of the selector circuit 36 shown in FIG. 4 is at high level or not. If the input signal is present, the register D is incremented at a step 146, and the address N at that time is temporarily stored at a step 147.

On the other hand, when no input signal has been found at the step 145, the NOP corresponding to the steps 146 and 147 is inserted at a step 148. Further, the process time matching is performed so that processes executed through any routes may result in a same time lapse.

At a step 149, the address N is incremented and subsequently shifted to the left by four bits at a step 150. It is then checked at a step 151 whether the data N4 resulting from the shift is equal to '70' or not. More specifically, at this step 151, it is checked whether the 16 addresses corresponding to the one bit length of data have been outputted. Unless N4="0", the NOP is inserted. Subsequently, at a step 152, correction or adjustment of time is performed and then jump is made to the step 144.

On the other hand, when it is found at the step 151 that N4=0, it is checked at a step 153 whether B=8. When B≠8, this means that the data sending has not yet been completed. Accordingly, jump is made to the step 142 to allow the process to be consecuted.

When it is found at the step 153 that B=8, signal "1" is outputted to the terminal TX1. In other words, the step 154 for outputting the stop bit STPB is executed to establish the length of the stop bit (step 155). Thereafter, the registers N and B are cleared.

Figure 10A:
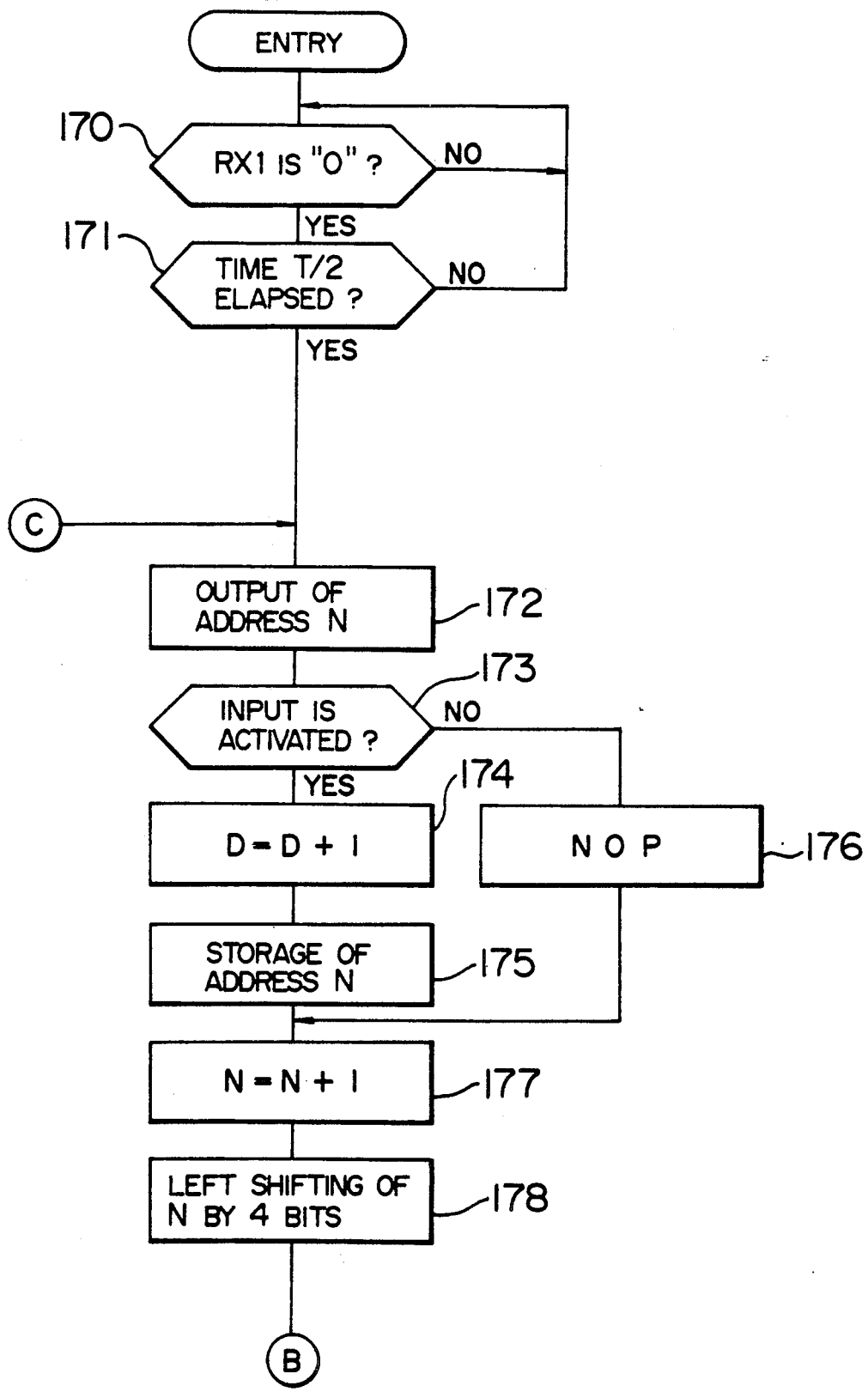
Figure 10B:
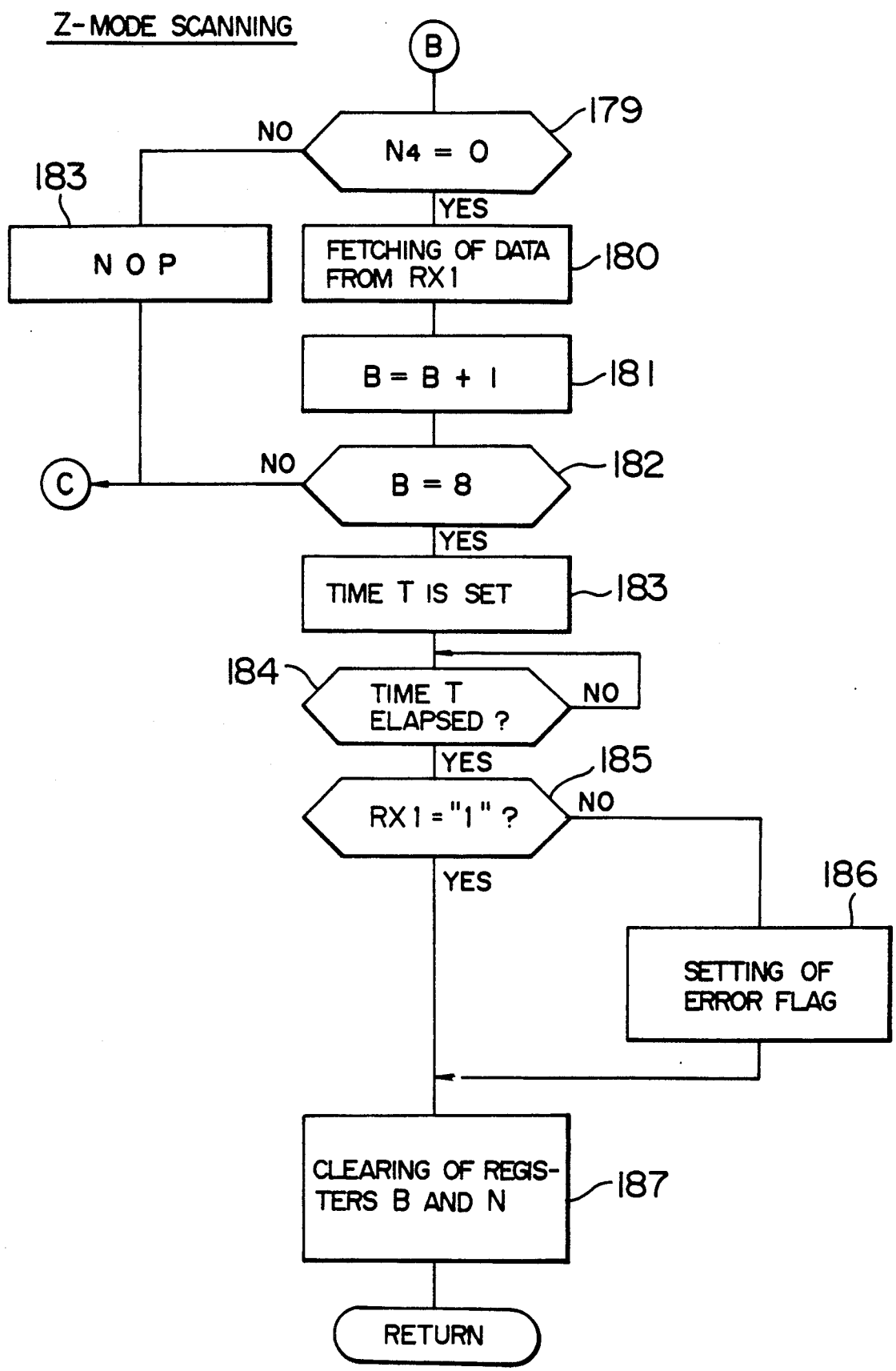

FIGS. 10A and 10B are views for illustrating the X-mode scanning in which the processing and the receiving of data from the main control circuit is performed in synchronism with the scanning.

At steps 170 and 171, it is ascertained that the input signal to the terminal RX1 has been "0" for the time of T/2. In other words, the start bit STB is identified. Thereafter, in succession to the confirmation of the presence of data to be received, the starting of scanning is synchronized with the reception of data.

Correlation between the reception processing and the scanning processing is so selected that 16 scanning addresses constitute one bit length of data, as in the case of the aforementioned sending processing.

At a step 172, the address N is outputted. This corresponds to the address signals (a) and (b) supplied to the selector circuit 36 and the decoder circuit 37. Next, it is checked at a step 173 whether input signal is present or not. This step corresponds to the checking as to whether the output line 52 of the selector circuit 36 shown in FIG. 4 is at high level or not. When the input signal is present, the register D is incremented at a step 174, and the address N at that time is stored in a temporary memory at a step 175.

When it is found at the step 173 that no input signal is present, the NOP 176 corresponding to the step 174 and 175 is inserted to realize the processing time matching regardless of the routes along which the processing may be executed.

At a step 177, the address N is incremented. Next, at a step 178, the address N is shifted to the left by four bits. It is checked at a step 179 whether the data $N_4$ resulting from the shift is "0" or not. This step 179 is for the purpose of determining whether 16 addresses corresponding to one bit length of data have been outputted or not. Unless $N_4=0$, the NOP 183 is inserted to execute the time correcting step and then jump is made to the step 172.

On the other hand, when it is found at the step 179 that $N_4=0$, the input data to the terminal RX1 is fetched at a step 180 to be stored in a data area.

At a next step 181, the register B is incremented, being followed by a step 182 where it is checked whether or not the updated value B is equal to "8" or not, to determine whether or not eight bits of the received data have been completely fetched or not. If not, jump is made to the step 172 to continue the process.

When it is found at the step 182 that B=8, the timer T is set at a step 183. Lapse of time set at the timer is checked at a step 184, to thereby determine the length of the stop bit STPB. When the level is found "1" at a step 185, this means the normal stop bit. Accordingly, the registers B and N are cleared at a step 187. At the step 185, the level of the input signal to the terminal RX1 is checked. When the level is "0", it is determined that the received data suffers error since the stop bit STPB must be "1". Accordingly, error flag is set at a step 186. The registers B and N are cleared at a step 187.

Figure 7:
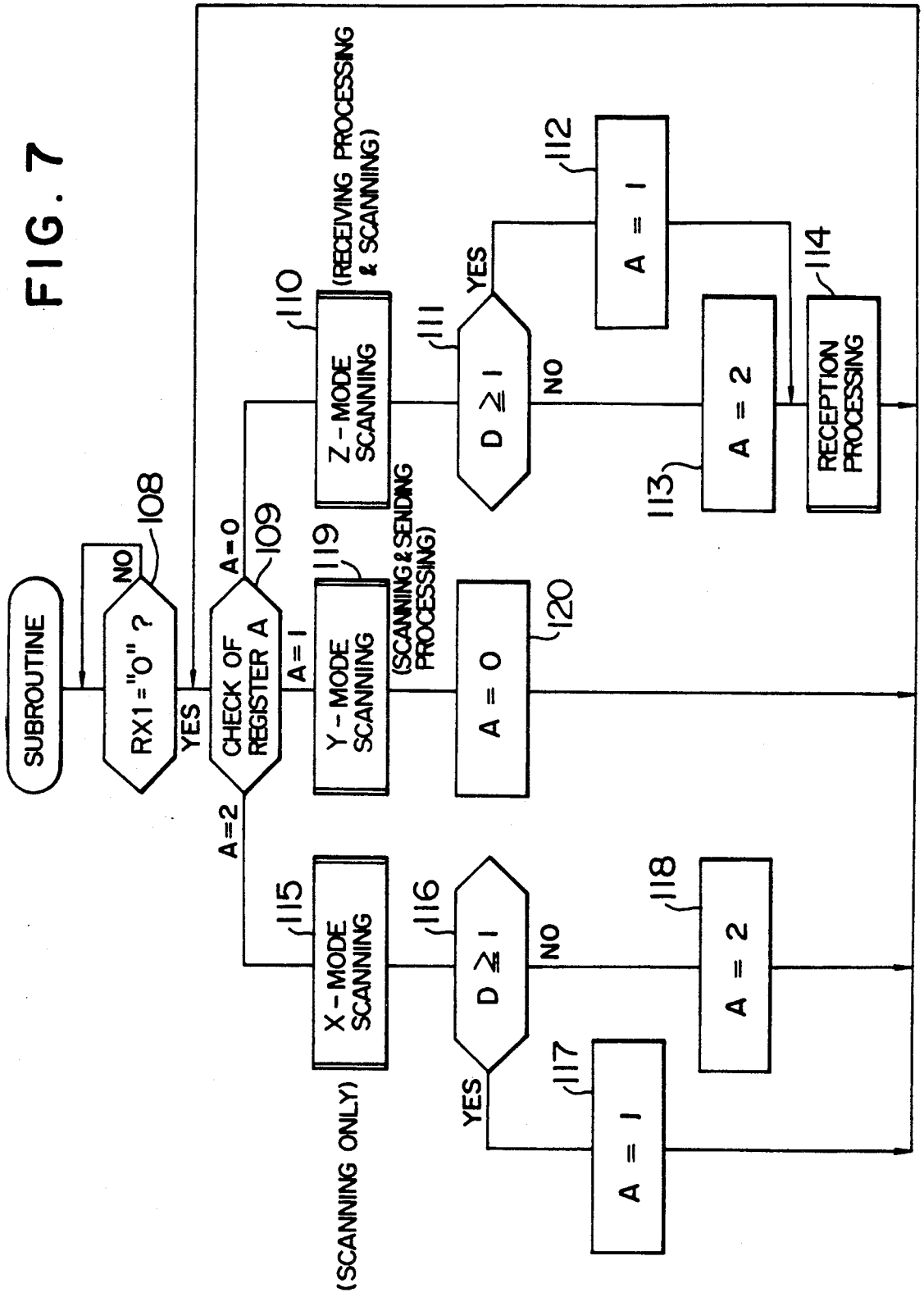
Figure 11:
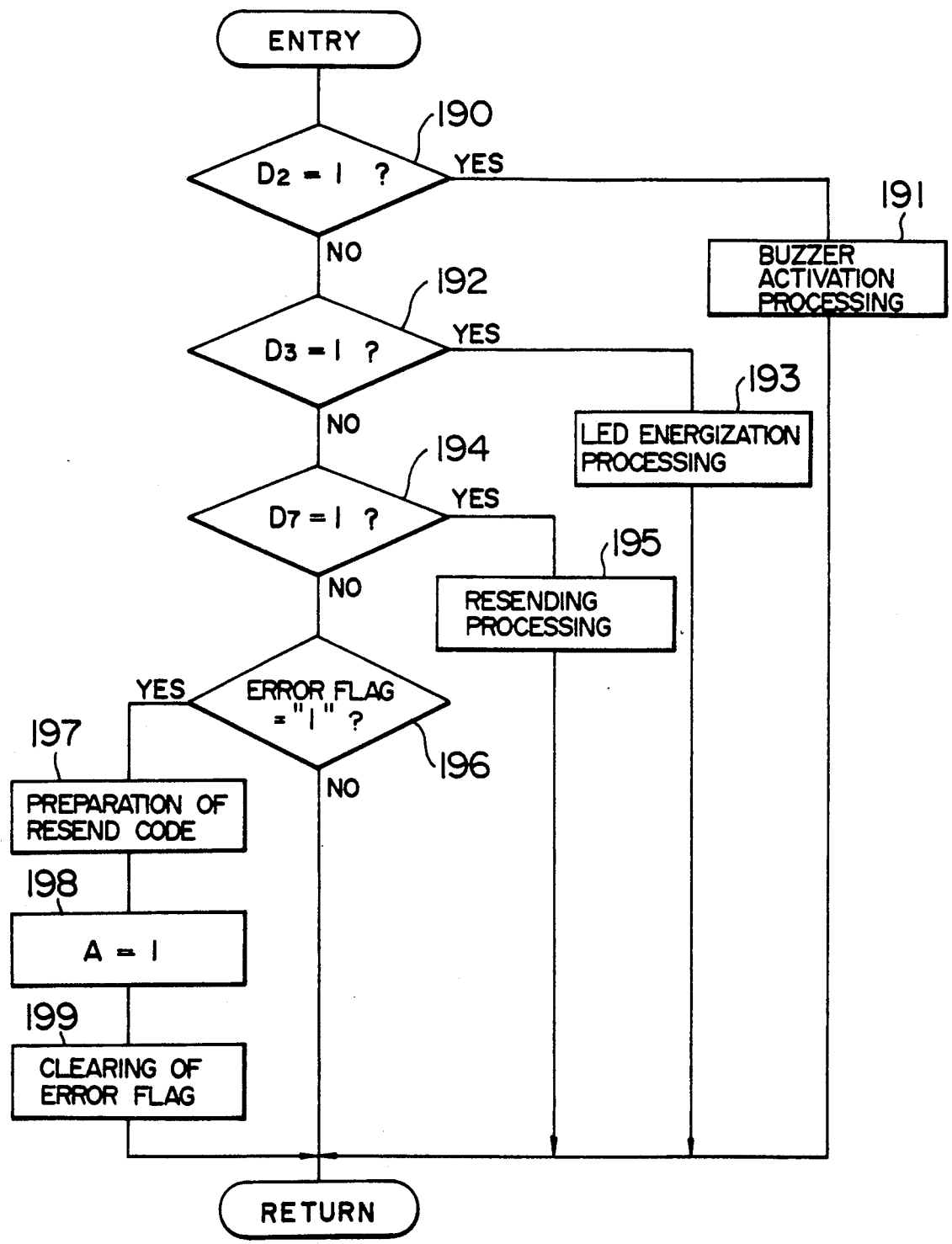

FIG. 11 is a view for illustrating in more detail the reception process step 114 shown in FIG. 7.

At a step 190, it is determined whether the third bit $D_2$ in the eight-bit control data shown in FIG. 5B is "1" or not. If $D_2$="1", this indicates that the buzzer be activated. Accordingly, the buzzer 44 shown in FIG. 4 is activated at a step 191. Otherwise, it is then determined at a next step 192 whether or not the fourth bit $D_3$ is "1". If $D_3$="1", the LED 41 shown in FIG. 4 is energized at a step 193. Otherwise, it is determined at a next step 194 whether or not the eighth bit $D_7$ of the control data is "1". If so, this means that resending of data is requested because the preceedingly sent data can not be correctly identified by the main control circuit. Accordingly, processing for the resending of the input signal is performed at a step 195.

On the other hand, when the decision step 194 results in "No", it is determined whether the error flag set at the step 186 is present or not. If present, a re-sending code requesting the re-sending of the control data is prepared at a step 197, while the register A is set to "1" for executing the Y-mode scanning at a step 198 and the error flag is cleared at a step 199. Thus, the steps 109 and 119 are executed to receive the control data again at the step 110. If the decision step results in "No", exit is made from the flow shown in FIG. 11.

The Y-mode scanning and the X-mode scanning have been described on the assumption that the scanning period is divided into eight intervals. However, the invention is never restricted to such a division. By way of example, the one scanning period may be selected equal to one bit transmission period. In that case, one signal is transmitted in the course of eight scannings. Further, the scanning period may be divided into four intervals so that one signal can be transmitted during two scannings. Reversely, the scanning period may be divided into sixteen intervals so that the sending and receiving can be effected twice during a single scanning period.

I claim:

1. A signal transfer apparatus for transferring signals between an input apparatus and a signal processing unit said input apparatus including an input unit for inputting signals by operation of keys and transferring the signal serially to said signal processing unit connected thereto, said signal transfer apparatus comprising:

scanning means for scanning said keys and extracting an address of an actuated key of said input unit wherein said scanning means performs said scanning and extracting during a scanning time period;

sending means for sending from said input unit a signal representative of said address extracted by said scanning means to said processing unit; and receiving means for receiving in said input unit a signal from said signal processing unit;

wherein at least one of said sending means and said receiving means includes dividing means for dividing said scanning time period, during which said keys are scanned and an address of an actuated key of said input unit is extracted, into a plurality of time intervals, and transmitting means for transmitting bitwise a signal between said input unit and said signal processing unit in synchronism with said time interval derived by said dividing means, such that said scanning and extracting is performed in parallel with said bitwise transmitting of said signal, wherein said dividing means includes means for dividing said scanning time period into a number of time intervals equal to the number of bits constituting said signal to be transmitted between said input unit and said signal processing unit.

2. A signal transfer apparatus according to claim 1, wherein said scanning means includes means for assigning addresses sequentially to all of said keys to discriminatively identify actuation of said keys, and means for storing those addresses of those keys which are identified as having been actuated.

3. A signal transfer apparatus according to claim 1, wherein said signal transmitted between said input unit and said signal processing unit includes eight bits along with a start bit located at the leading position and a stop bit located at the trailing position.

4. A signal transfer apparatus according to claim 3, wherein said scanning means further includes counting means for assigning said addresses, each including eight bits, by counting sequentially from "0" to "127".

5. A signal transfer apparatus according to claim 4, wherein said scanning means further includes sensing means for detecting a carry of a count value of said counting means to the most significant bit, and means for terminating said scanning upon detection of said carry by said sensing means.

6. A signal transfer apparatus according to claim 5, wherein said scanning means further includes means for clearing said counting means upon termination of said scanning by said terminating means.

7. A signal transfer apparatus according to claim 3, wherein said dividing means includes counting means for executing said scanning by counting sequentially the addresses each including eight bits from "0" to "127", sending means for sending timing at which four less significant bits of a count value of said counting means becomes "0", and means for dividing said scanning time period into eight time intervals in accordance with said timing.

8. A signal transfer apparatus according to claim 7, wherein said sending means includes shifting means for shifting a count value of said counting means toward more significant positions by four bits, and means for determining that said shifting results in "0".

9. A signal transfer apparatus according to claim 1, wherein said sending means and said receiving means includes said dividing means and said transmitting means, respectively.

10. A signal transfer apparatus according to claim 9, wherein said scanning means further includes means for detecting the presence of an actuated key, means for commanding an of a sending process to be performed by said sending means upon detection of said actuated key, and means for commanding an of a scanning process to be performed by said scanning means unless said detecting means detects the presence of an actuated key.

11. A signal transfer apparatus according to claim 9, wherein said sending means further includes means for commanding an of a receiving process to be performed by said receiving means in succession to the execution of a scanning process performed by said scanning means and a sending process performed by said sending means.

12. A signal transfer apparatus according to claim 9, wherein said receiving means further includes means for detecting the presence of an actuated key, means for commanding an of a sending process to be performed by said sending means upon detection of an actuated key by said detecting means, and means for commanding an execution of a scanning process to be performed by said scanning means unless an actuated key is detected by said detecting means.

13. A signal transfer apparatus comprising:
a plurality of contacts switched by operation of keys;
scanning means for scanning all of said contacts and extracting contacts switched, said scanning means performing said scanning and extracting during a scanning time period;
dividing means for dividing said scanning time period into a plurality of time intervals;
means for determining presence of contacts switched during said scanning and extracting being performed by said scanning means;
means for allowing execution of said scanning when said determining means determines that no switched contacts are present;
means for allowing execution of said scanning upon determination of the presence of a switched contact while parallelly allowing sending means for sending a signal to send a signal related to said switched contact serially and bitwise in synchronism with time intervals derived by said dividing means;
stand-by means for awaiting reception of said signal sent by said sending means; and
means for receiving serially and bitwise said signal related to said switched contact upon detection of reception by said stand-by means in synchronism with said time intervals derived by said dividing means while allowing said scanning means to perform said scanning and extracting.

* * * * *